United States Patent [19]

Chatani

[11] Patent Number: 5,590,107
[45] Date of Patent: Dec. 31, 1996

[54] INFORMATION PROCESSING APPARATUS FOR ADDING HANDWRITTEN DATA TO A MAGNETO-OPTICAL DISC DATABASE

[75] Inventor: Masayuki Chatani, Tokyo, Japan

[73] Assignee: Sony Corporation, Tokyo, Japan

[21] Appl. No.: 611,415

[22] Filed: Mar. 5, 1996

Related U.S. Application Data

[63] Continuation of Ser. No. 217,798, Mar. 24, 1994, abandoned.

[30] Foreign Application Priority Data

Mar. 31, 1993 [JP] Japan .................................. 5-072701

[51] Int. Cl.⁶ .......................................................... G11B 7/00
[52] U.S. Cl. .............................................. 369/54; 369/32
[58] Field of Search ................................. 369/32, 54, 47, 369/48, 50, 58, 103, 93, 109; 364/709.11

[56] References Cited

U.S. PATENT DOCUMENTS 4,866,646  9/1989  Nakamura et al. ................. 364/709.11
5,150,339  9/1992  Ueda et al. ................................ 369/32
5,166,913  11/1992  Ichiyama ................................. 369/13

FOREIGN PATENT DOCUMENTS

| 0232134 | 8/1987 | European Pat. Off. ......... G11B 7/013 |
| 0389261 | 9/1990 | European Pat. Off. ......... G11B 31/00 |
| 0561000A1 | 9/1993 | European Pat. Off. ......... G11B 13/04 |
| 0591636A2 | 4/1994 | European Pat. Off. ......... G11B 11/10 |
| 2578083 | 8/1986 | France ........................... G11B 7/08 |

*Primary Examiner*—Georgia Y. Epps
*Assistant Examiner*—P. W. Huber
*Attorney, Agent, or Firm*—Limbach & Limbach LLP

[57] ABSTRACT

Disclosed herein is an information processing apparatus capable of storing therein modifier information such as an underline, a correction of contents, etc. with respect to fixed and stored information. A microcomputer effects processing corresponding to an input and outputs information indicative of the result of processing therefrom. An optical magnetic recording and reproducing device records the information indicative of the result of this processing, which has been outputted from the microcomputer, on a read/write area of a hybrid disc.

15 Claims, 15 Drawing Sheets

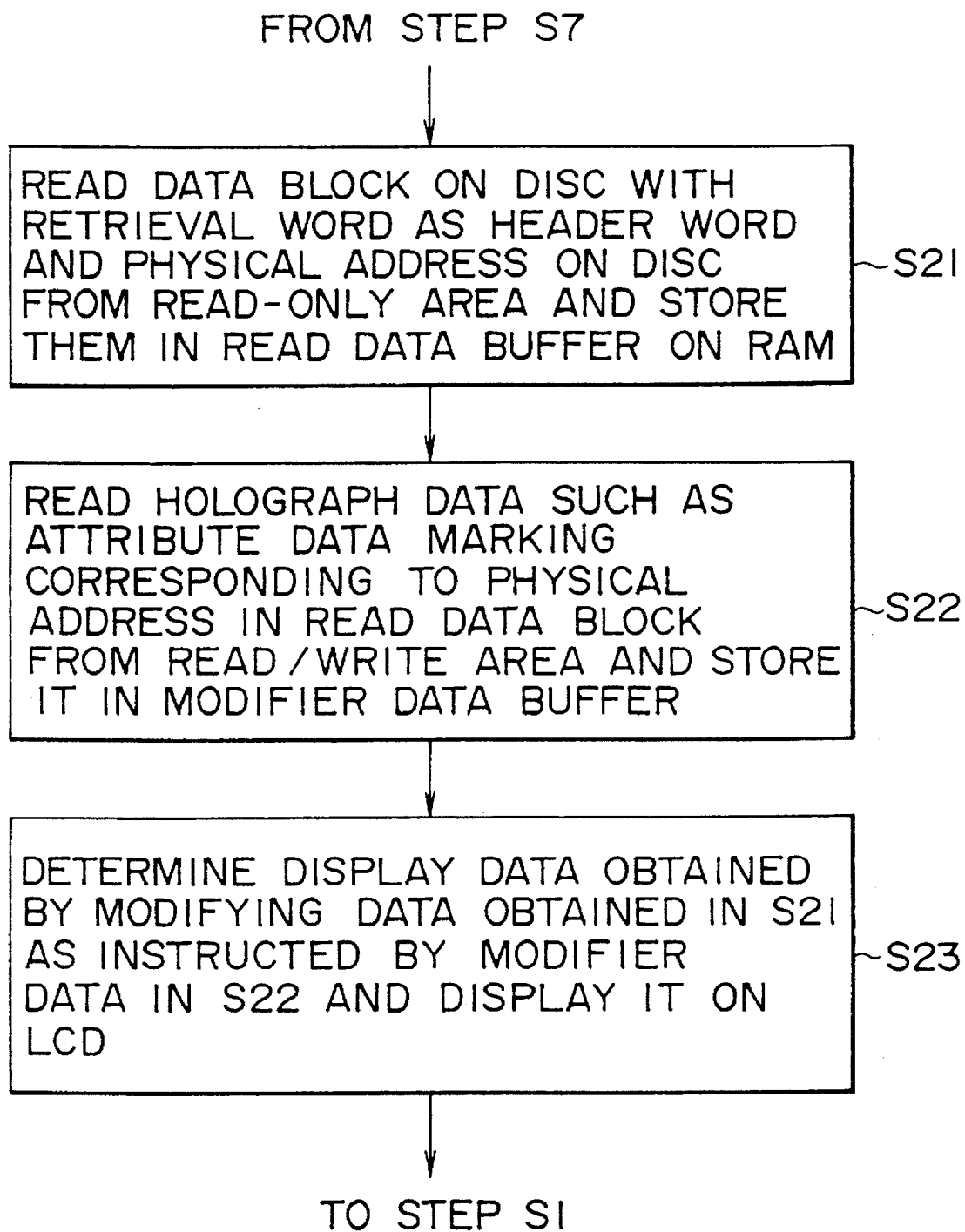

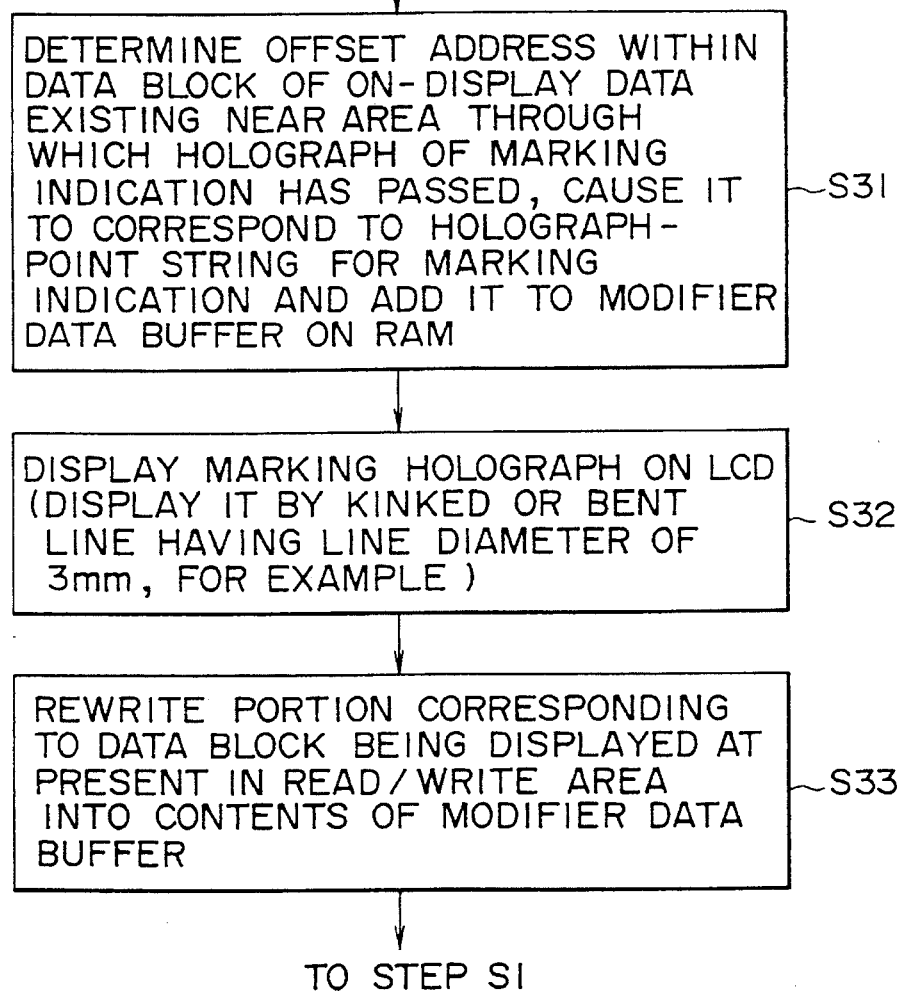

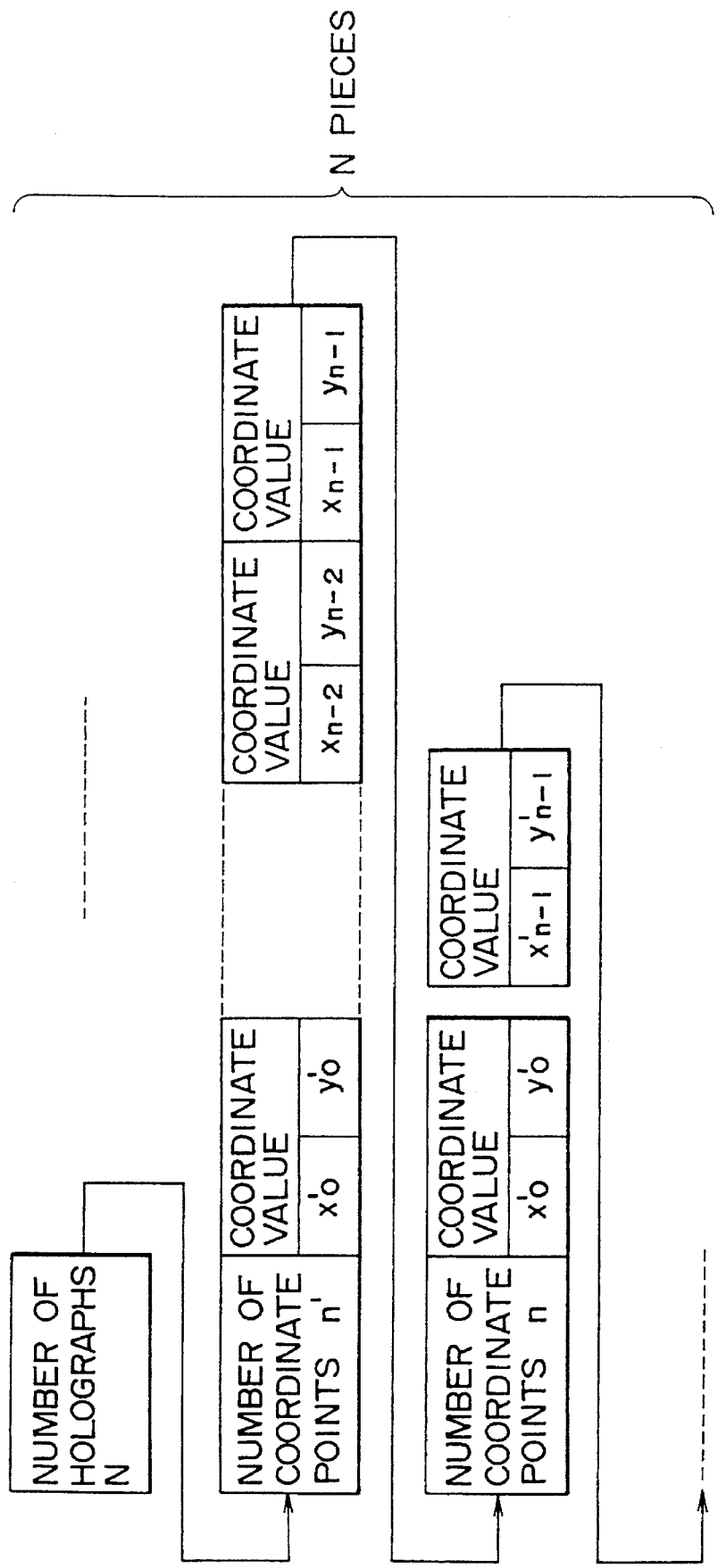

FIG. 13

| "MARKING" INDICATION | NUMBER OF BENT LINES M | COORDINATE VALUE | COORDINATE VALUE | | ... | COORDINATE VALUE | COORDINATE VALUE |
|---|---|---|---|---|---|---|---|
| | | $x_0$ | $y_0$ | $x_1$ | $y_1$ | $x_{M-2}$ | $y_{M-2}$ | $x_{M-1}$ | $y_{M-1}$ |

FIG. 14

| "MASKING" INDICATION | TOP COORDINATE VALUE AT LEFT UPPER POSITION OF CIRCUMSCRIBED QUADRILATERAL, INDICATIVE OF MASKING SYMBOL | | TOP COORDINATE VALUE AT RIGHT LOWER POSITION OF CIRCUMSCRIBED QUADRILATERAL, INDICATIVE OF MASKING SYMBOL | |
|---|---|---|---|---|
| | $x_0$ | $y_0$ | $x_1$ | $y_1$ |

FIG. 15

| PHYSICAL ADDRESS ON DISC, OF READ DATA | NUMBER OF DATA BYTES R | READ DATA | | | | |
|---|---|---|---|---|---|---|
| | | CHARACTER CODE 0 | 1 | 2 | 3 | ... | R-1 |

FIG. 17

```
case [KEISU]  1   BOX
OUTER BOX  2. FONT CASE
casual [KAZUAL]
  1. ACCIDENTAL, UNEXPECTED
  2. OCCASIONAL, EXTRAORDINARY
cat [KYATTO] CAT,
ANIMAL OF CAT FAMILY
```
~24

FIG. 18

```
case [KEISU]  1   BOX
OUTER BOX  2. FONT CASE
casual [KAZUAL]
  1. ACCIDENTAL, UNEXPECTED
  2. OCCASIONAL, EXTRAORDINARY
~cat~ [KYATTO] CAT,
ANIMAL OF CAT FAMILY
```
~24

FIG. 19

```
case [KEISU] I    BOX
OUTER BOX  2. FONT CASE
casual [KAZUAL]
  1. ACCIDENTAL, UNEXPECTED
  2. OCCASIONAL, EXTRAORDINARY
cater [KEITA]  COOKING
PROVIDE
```
~24

FIG. 20

```
case [KEISU] I    BOX
OUTER BOX  2. FONT CASE
casual [KAZUAL]
  1. ACCIDENTAL, UNEXPECTED
  2. OCCASIONAL, (EXTRAORDINARY)
                      IMPORTANT
cat [KYATTO] CAT,
ANIMAL OF CAT FAMILY
```
~24

5,590,107

INFORMATION PROCESSING APPARATUS FOR ADDING HANDWRITTEN DATA TO A MAGNETO-OPTICAL DISC DATABASE

This is a continuation of application Ser. No. 08/217,798 filed on Mar. 24, 1994, now abandoned.

BACKGROUND OF THE INVENTION

1. Field of the Invention

The present invention relates to an information processing apparatus suitable for use in a technical field of a portable personal data base, for example.

2. Description of the Related Art

As a conventional information processing apparatus, there is known one having a structure shown in FIG. 21. In FIG. 21, a CPU 54 controls operations of respective components. A keyboard 50 inputs indications by a user for operations to be executed. A ROM 56 has programs stored therein, for causing the CPU 54 to effect operations corresponding to the indications for the operations. A RAM 58 is used as a work area at the time of execution of the programs. An input/output interface 60 effects the transfer of various data between an external peripheral device and the CPU 54. The CPU 54, the ROM 56, the RAM 58 and the input/output interface 60 constructs a microcomputer 52.

A CD-ROM (Compact Disc Read Only Memory) type reader (CD-ROM drive) 66 reads data recorded on a CD-ROM medium in response to an instruction or indication issued from the CPU 54 and transfers it to the CPU 54. An LCD driver 62 serves so as to display display data outputted from the CPU 54 on an LCD 64 and displays the data read from the CD-ROM drive 66 thereon. A CD-ROM read from the CD-ROM drive is normally of a data base including various information such as characters, graphic forms, voices, etc.

Since the CD-ROM has been used as the recording medium for the data base, new information cannot be written into the recording medium. Accordingly, the aforementioned conventional information processing apparatus are accompanied by the following problems.

1. A function for recording handwritings or holographs equivalent or corresponding to an ⌊underline⌉ made by a red pen or the like, a ⌊mark⌉ made by a marker pen, etc., and symbols, both of which have been represented on a normal paper medium, cannot not be realized. Further, the holographs and the symbols cannot not be stored so as to correspond to the contents of the data base.

2. Even if the above ⌊underline⌉ and ⌊mark⌉ are temporarily stored within the RAM used as the work area, information about the ⌊underline⌉ and ⌊mark⌉ is normally erased simultaneously with the ejection of the CD-ROM, thus causing inconvenience that the ⌊underline⌉ and the ⌊mark⌉ are not left behind when the CD-ROM is loaded into the information processing apparatus again.

3. The following operations A, B and C cannot be effected on the data base:

A. Modification of contents

B. Change in outward appearance at the time of visual representation (change in font size, color, style of type, etc. of header word)

C. Editing operations such as virtual removal of header word and its corresponding contents from the data base.

SUMMARY OF THE INVENTION

With the foregoing in view, an object of the present invention is therefore to provide an information processing apparatus capable of storing therein modifier information such as an underline, a correction of contents, etc. with respect to fixed and stored information.

According to one aspect of the present invention, for achieving the above object, there is provided an information processing apparatus comprising processing means (e.g., a microcomputer 12 shown in FIG. 1) for effecting processing corresponding to an input and outputting information indicative of the result of processing therefrom. There is further provided recording and reproducing means (e.g., an optical magnetic recording and reproducing device 8 shown in FIG. 1) for recording information on and reproducing the same from a disc recording medium (e.g. a hybrid disc 804 shown in FIG. 2). The disc recording medium has a read-only area with predetermined information recorded thereon in advance and a read/write area for storing therein the information indicative of the result of processing, which has been outputted from the processing means.

According to the information processing apparatus of the present invention, the processing means effects the processing corresponding to the input and outputs the information indicative of the result of processing therefrom. The recording and reproducing means records the information indicative of the result of processing, which has been outputted from the processing means on the read/write area. The read/write area is than the read-only area in which the predetermined information in the disc recording medium has been recorded in advance. Accordingly, modifier information with respect to the information recorded on the read-only area of the disc recording medium can be written into the read/write area of the disc recording medium.

BRIEF DESCRIPTION OF THE DRAWINGS

While the specification concludes with claims particularly pointing out and distinctly claiming the subject matter which is regarded as the invention, it is believed that the invention, the objects, features and advantages thereof will be better understood from the following description taken in connection with the accompanying drawings in which:

FIG. 7 is a flowchart for describing a third portion of the sequential operation executed by the embodiment shown in FIG. 1;

FIG. 8 is a flowchart for describing a fourth portion of the sequential operation executed by the embodiment shown in FIG. 1;

FIG. 9 is a view for explaining coordinate-point string data employed in the embodiment shown in FIG. 1;

FIG. 10 is a view for explaining one example of the contents stored in a holograph buffer of a RAM 18 employed in the embodiment shown in FIG. 1;

FIG. 13 is a view for describing one example of a format for a marking indicating code and retrieval words both stored in the operation indicating buffer of the RAM 18 shown in FIG. 1;

FIG. 14 is a view for describing one example of a format for a masking indicating code and retrieval words both stored in the operation indicating buffer of the RAM 18 shown in FIG. 1;

FIG. 15 is a view for explaining one example of a format for a read data buffer of the RAM 18 shown in FIG. 1;

FIG. 17 is a view for explaining the contents displayed on an LCD 24 immediately after data has been read from a disk in Step S23;

FIG. 18 is a view for explaining the contents displayed on the LCD 24 in Step S10 where a masking indication (>) is drawn on a header word to be masked;

FIG. 19 is a view for explaining the manner in which a header word subsequent to the masked header word has been displayed on the LCD 24 in Step S11 after a masking process has been executed;

FIG. 20 is a view for explaining the contents displayed on the LCD 24 in Step S32 at the time that the term ⌊casual⌉ is underscored with a wavy line as a marking, a translated word ⌊extraordinary⌉ is surrounded by a circular holograph and a holograph ⌊important⌉ is inputted.

DETAILED DESCRIPTION OF THE PREFERRED EMBODIMENTS

Figure 1:
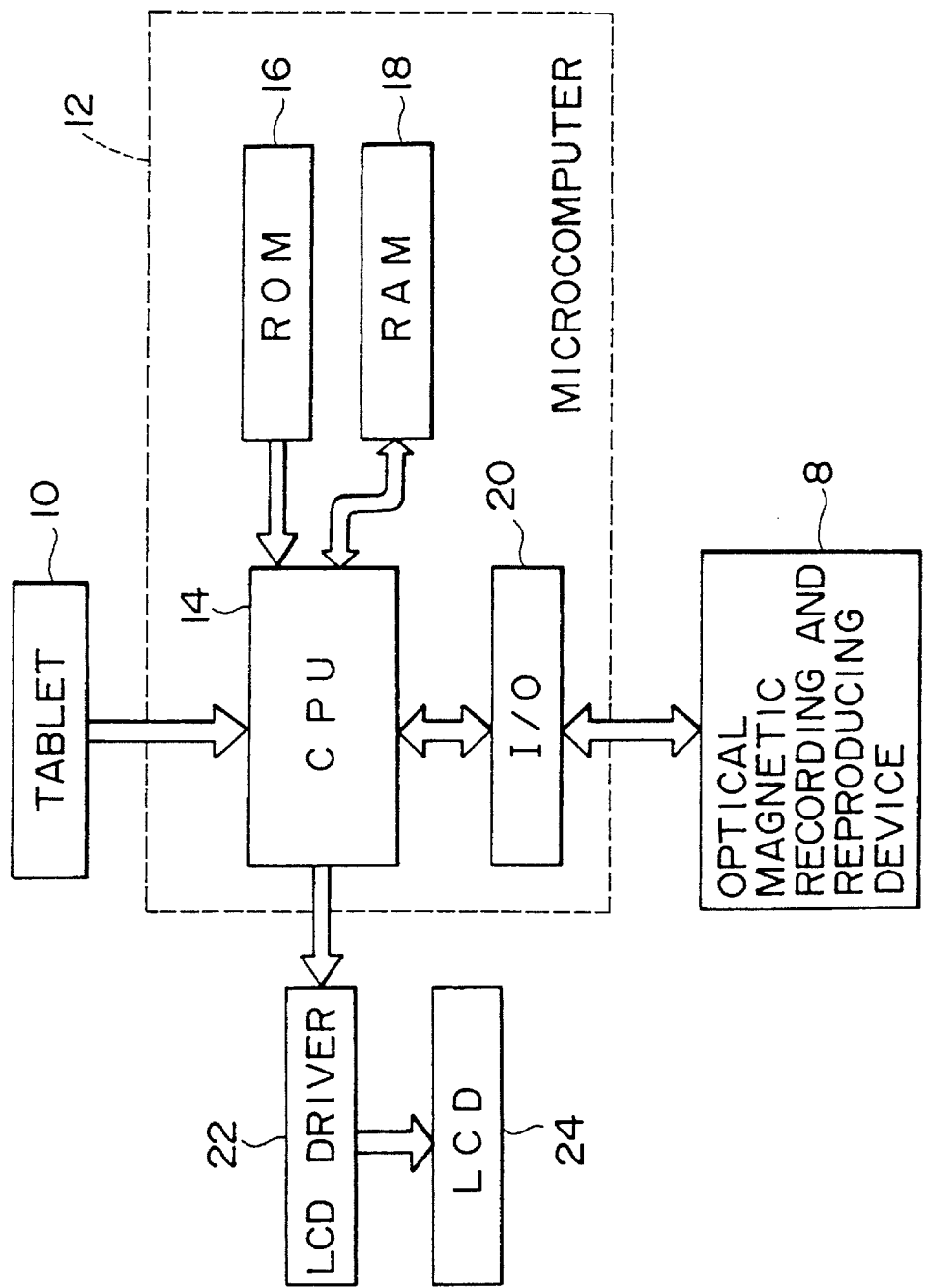
FIG. 1 is a block diagram showing the structure of one embodiment of an information processing apparatus of the present invention.

A preferred embodiment of the present invention will hereinafter be described in detail with reference to the accompanying drawings. FIG. 1 shows the structure of one embodiment of an information processing apparatus of the present invention. A tablet 10 is of a pressure sensitive tablet for outputting data corresponding to an X–Y coordinate value at a position pressed by either a user's finger or a pen (a pen 30 shown in FIG. 4) or the like. The data outputted from the tablet 10 is supplied to the microcomputer (hereinafter abbreviated as "micon") 12.

The micon 12 comprises a CPU 14, a ROM 16 having programs used by the CPU 14, which have been stored therein in advance, a RAM 18 used as a work area, and an input/output interface 20 which performs the transfer of various data between an external peripheral device and the CPU 14.

An LCD (Liquid Crystal Display) driver 22 drives an LCD (Liquid Crystal Display) 24 in response to display data supplied from the micon 12 so that the contents displayed on the LCD 24 are controlled by the micon 12.

The optical magnetic recording and reproducing device 8 is designed based on a minidisk® (trademark) system which has heretofore been developed for personal audio devices (such as portable, stationary and a vehicle built-in type devices). This type of minidisk system makes use of any one of a read (reproduction)-only optical disk having a diameter of 64 mm, a read/write type or reloadable MO (Magneto-optical) disc and a hybrid (also called a partial ROM disk) disc having both a read/write (i.e., reloadable) area and a read-only area, i.e., a recording medium accommodated in a cartridge (W×L×H=72 mm×68 mm×5 mm). Data is recorded on either the MO disc or the hybrid disc by a magnetic-field modulation direct overwrite recording system. When the read-only optical disk is used, a reproduced signal is detected by making use of a diffraction phenomenon of light at a bit string on an intended track, based on the principle similar to that of a CD. When the read/write type magneto-optical disc is used, a difference in polarization angle (Kerr turning angle) of light reflected from an intended track is detected to thereby detect or produce a reproduced signal. When the read-only area of the hybrid disc is used, a reproduced signal is detected by using a diffraction phenomenon of light at a bit string on an intended track. On the other hand, when the read/write area of the hybrid disc is used, a difference in polarization angle (Kerr turning angle) of light reflected from an intended track is detected to thereby detect or produce a reproduced signal.

In the optical magnetic recording and reproducing device 8 called the minidisk® system, the integration of respective circuit elements and the optimization of parts of respective mechanisms can be achieved and the optical magnetic recording and reproducing device 8 can be reduced in size and weight over its entirety under a process for developing it as a personal audio device. Further, battery operation can be achieved owing to less power consumption. Moreover, the optical magnetic recording and reproducing device 8 has a feature that a storage capacity (of 140 Mbytes) substantially identical to that of a known 3.5 inch MO disk drive is provided and the recording medium can be replaced with another. In addition to such a feature, a main body of the optical magnetic recording and reproducing device 8 and the recording medium can be reduced in manufacturing cost due to a mass-production effect as compared with other MO disk drives. Further, the reliability has sufficiently been demonstrated from the actual result of utilization of the optical magnetic recording and reproducing device as a personal audio device.

Figure 3:
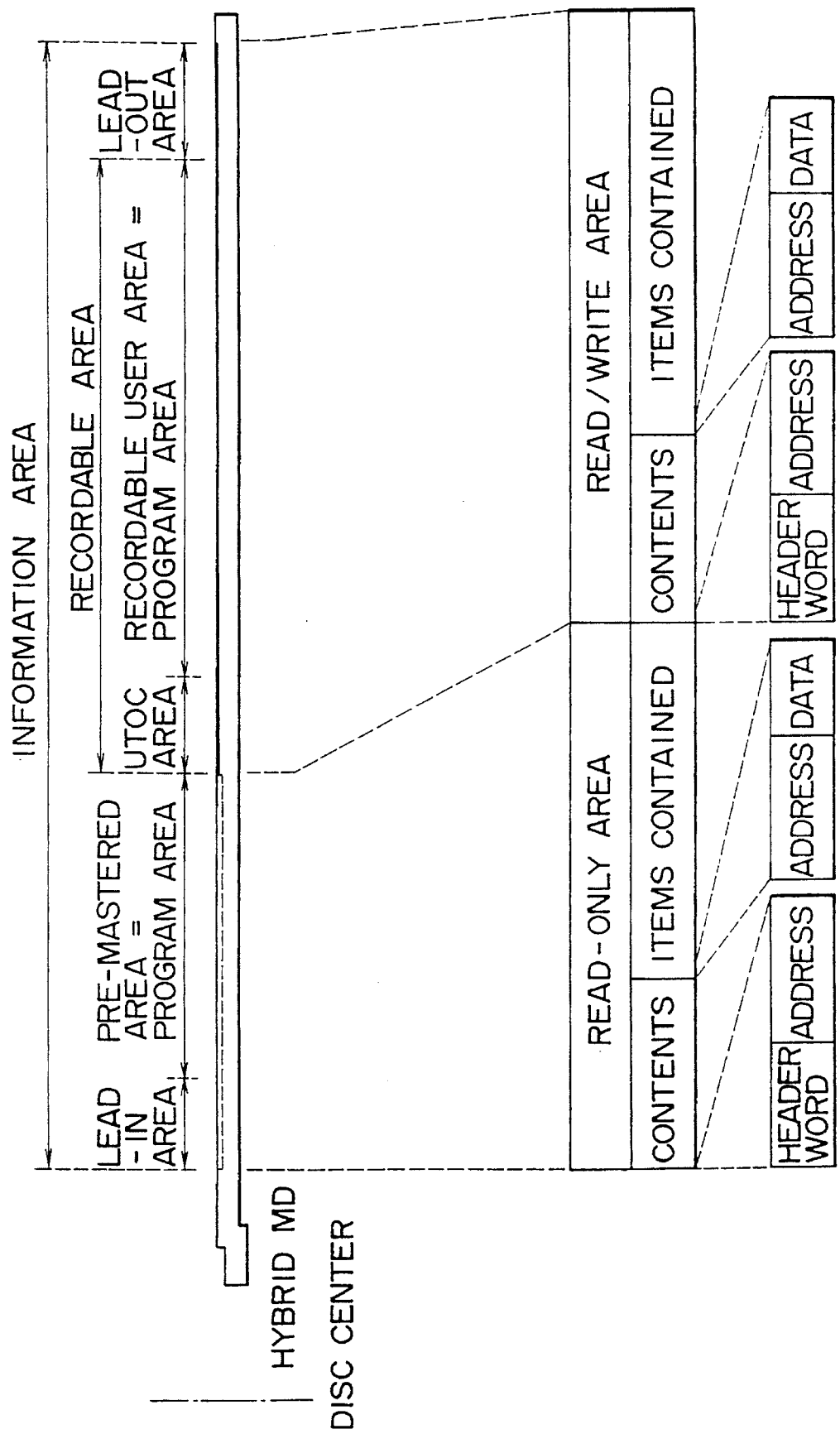
FIG. 3 is a view for describing one example of a format for a hybrid disk 804 employed in the optical magnetic recording device 8 shown in FIG. 2.

The optical magnetic recording and reproducing device 8 employed in the present embodiment makes use of the hybrid disc corresponding to a disc-like recording medium having two kinds of areas: a read-only area and a read/write area. One example of a format for the hybrid disc 804 will be shown in FIG. 3. A description will first be made of the read-only area. A header word or headword and its address are recorded on or in contents corresponding to a TOC (Table Of Contents) in a Lead-in area on the innermost periphery side of the disc. Next, data such as characters, graphic forms, etc. are recorded in items contained subsequent to the TOC every addresses. A description will next be made of the read/write area. A header word and its address are first recorded in contents corresponding to a UTOC (User TOC) and data such as characters, graphic forms, etc. are recorded in items contained subsequent to the UTOC every addresses. The optical magnetic recording and reproducing device 8 is controlled by the CPU 14 through the I/O interface 20. When the CPU 14 instructs the optical magnetic recording and reproducing device 8 to perform a reading operation, the optical magnetic recording and reproducing device 8 reads data from the hybrid disc 804 and sends it to the CPU 14. When the CPU 14 instructs the optical magnetic recording and reproducing device 8 to perform a writing operation, the optical magnetic recording and reproducing device 8 writes data into the hybrid disc 804.

Figure 2:
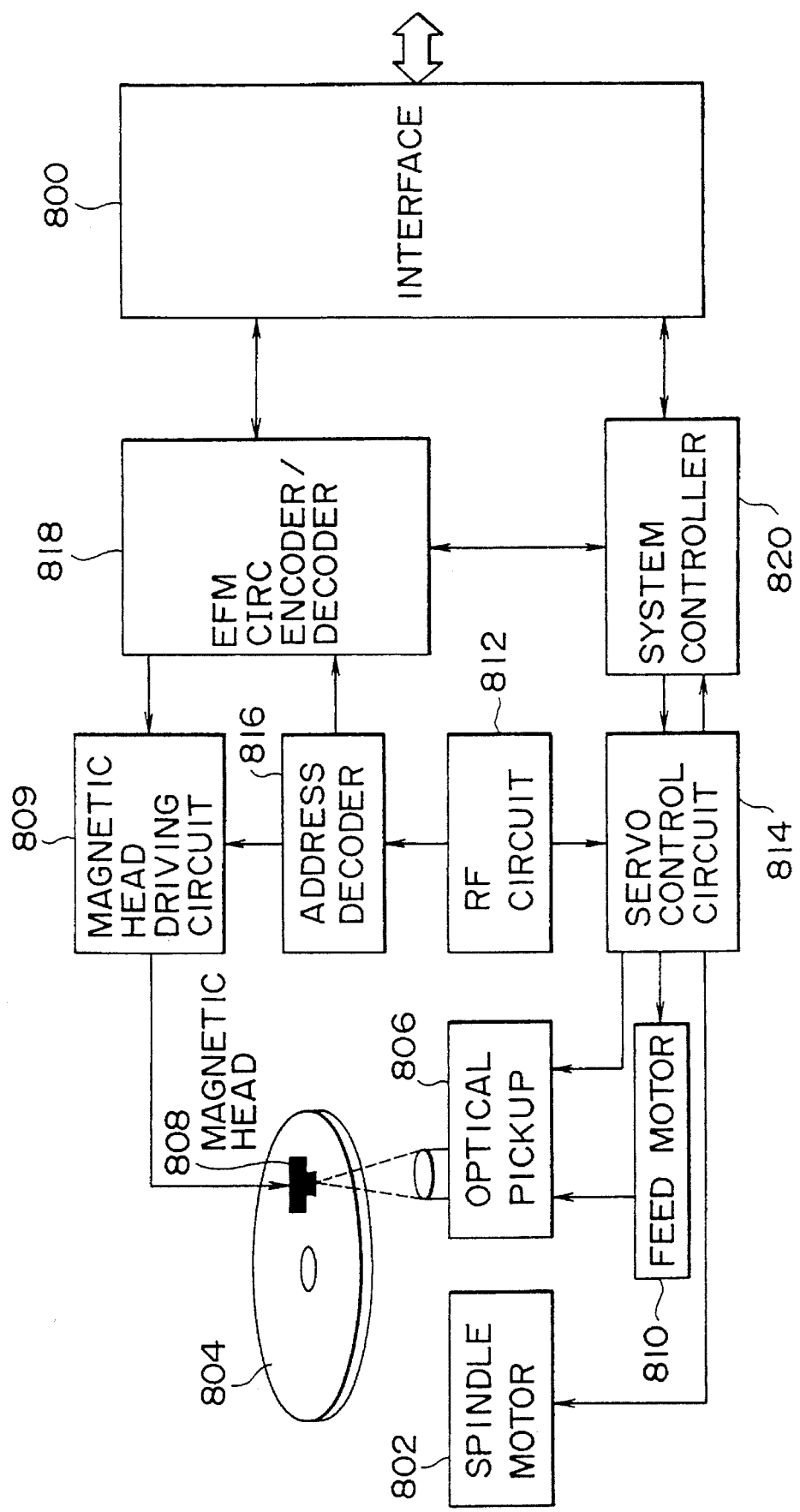
FIG. 2 is a block diagram illustrating the structure of one example of an optical magnetic recording device 8 employed in the information processing apparatus shown in FIG. 1.

FIG. 2 shows one example of the structure of the optical magnetic recording and reproducing device 8 shown in FIG. 1. In the optical magnetic recording and reproducing device 8, a modulated magnetic field corresponding to recording data is applied to a magnetic head 808 in a state in which the hybrid disc 804 rotatably driven by a spindle motor 802 has been irradiated with a laser beam emitted from an optical pickup 806 to thereby perform a magnetic-field modulation direct overwrite recording process along a recording track in a read/write area, i.e., a reloadable area. Next, the optical pickup 806 causes the laser beam to be traced throughout an intended track in the read-only area of the hybrid disc 804 so that data is optically reproduced. Further, the optical pickup 806 causes the laser beam to be traced throughout an intended track in the read/write area of the hybrid disc 804 so that data is reproduced in a magneto-optical manner.

The optical pickup 806 comprises a laser beam source such as a laser diode or the like, optical parts such as a collimator lens, an objective lens, a polarization beam splitter, a cylindrical lens, etc. and photodetectors divided in predetermined positions, for example. The optical pickup 806 is situated in a position opposite to that of the magnetic head 808 with the hybrid disc 804 interposed therebetween and positioned by the feed motor 810.

When it is desired to record data on the hybrid disc 804, the magnetic head 808 is driven by a magnetic head driving circuit 809 and the optical pickup 806 irradiates an intended track on the hybrid disc 804 to which the modulated magnetic field corresponding to the recording data is applied, with the laser beam, thereby recording the data thereon under thermomagnetic action.

The optical pickup 806 detects a reflected laser beam of the laser beam applied to the intended track to thereby detect a focus error using an astigmatism method, for example, and to detect a tracking error using a push-pull method, for example. Further, when the optical pickup 806 detects a reproduced signal using a diffraction phenomenon of light at a bit string on the intended track in the read-only area of the hybrid disc 804 and reproduces data from the read/write area of the hybrid disc 804, the optical pickup 806 detects a difference in polarization angle (Kerr turning angle) of the light reflected from the intended track to thereby produce a reproduced signal.

An output from the optical pickup 806 is supplied to a RF circuit 812. The RF circuit 812 extracts a focus error signal and a tracking error signal from the output supplied from the optical pickup 806 and supplies the extracted signals to a servo control circuit 814. Further, the RF circuit 812 by-level digitizes the reproduced signal and supplied the digitized signal to an address decoder 816. The address decoder 816 decodes an address based on or from the by-level digitized reproduced signal supplied from the RF circuit 812 and outputs it to an EFM (Eight to Fourteen Modulation). CIRC (Cross Interleave Reed-Solomon Code) encoder/decoder 818. Further, the address decoder 816 supplies by-level digitized reproduced data other than by-level digitized reproduced data related to the address to the EFM. CIRC encoder/decoder 818.

The servo control circuit 814 comprises a focus servo control circuit, a tracking servo control circuit, a spindle motor servo control circuit and a thread servo control circuit, etc., for example.

The focus servo control circuit effects focus control on an optical system of the optical pickup 806 so that the focus error signal is brought to zero. The tracking servo control circuit controls the feed motor 810 for the optical pickup 806 so that the tracking error signal is brought to zero.

Further, the spindle motor servo control circuit controls the spindle motor 802 so that the hybrid disc 804 is rotated and driven at a predetermined rotational speed (e.g., a predetermined linear velocity). The thread servo control circuit causes the feed motor 810 to move or displace the magnetic head 808 and the optical pickup 806 to a position of an intended track on the hybrid disc 804, which is designated or specified by a system controller 820.

The EFM-CIRC encoder/decoder 818 effects a coding process for error correction, i.e., a coding process based on the CIRC (Cross Interleave Reed-Solomon Code) on data supplied through a bus 100 and an interface 800 and effects a modulation process suitable for recording, i.e., an EFM (Eight to Fourteen Modulation) coding process on the data.

Coded data outputted from the EFM-CIRC encoder/decoder 818 is supplied to the magnetic head driving circuit 809 as recording data. The magnetic head driving circuit 809 drives the magnetic head 808 so that the modulated magnetic field corresponding to the recording data is applied to the hybrid disc 804.

When the system controller 820 receives a write instruction from the CPU 14 through the interface 800, the system controller 820 controls a recording position for the recording data so that the recording data is recorded on a recording track of the hybrid disc 804. This control is carried out by controlling or managing the position of coded data outputted from the EFM-CIRC encoder/decoder 818 to be recorded on the hybrid disc 804 with the system controller 820 and supplying a control signal for designating the data recording position on the recording track of the hybrid disc 804 from the system controller 820 to the servo control circuit 814.

Upon reproduction, the EFM-CIRC encoder/decoder 818 effects an EFM demodulating process and a CIRC decoding process for error correction on the input by-level digitized reproduced data and outputs the so-processed data to the interface 800.

Further, when the system controller 820 receives a read instruction from the CPU 14 through the interface 800, the system controller 820 controls a position of data to be reproduced on a recording track of the hybrid disc 804 so that the reproduced data is obtained in sequence. This control is effected by managing the position of the reproduced data on the hybrid disc 804 with the system controller 820 and supplying a control signal for designating the data reproducing position on the recording track of the hybrid disc 804 from the system controller 820 to the servo control circuit 814.

Figure 4:
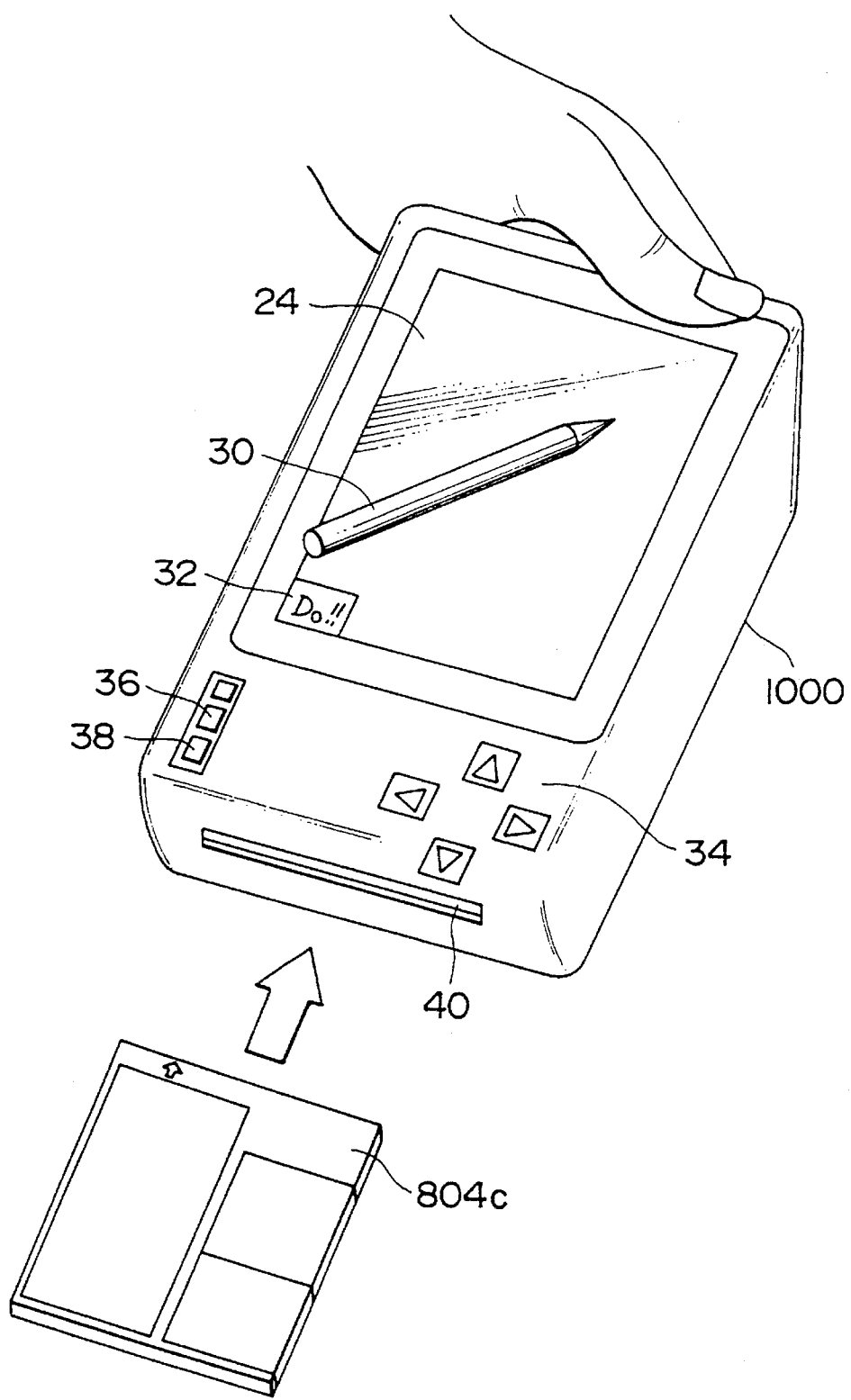
FIG. 4 is a perspective view showing one example of the structure of an external appearance of the embodiment shown in FIG. 1.
Figure 5:
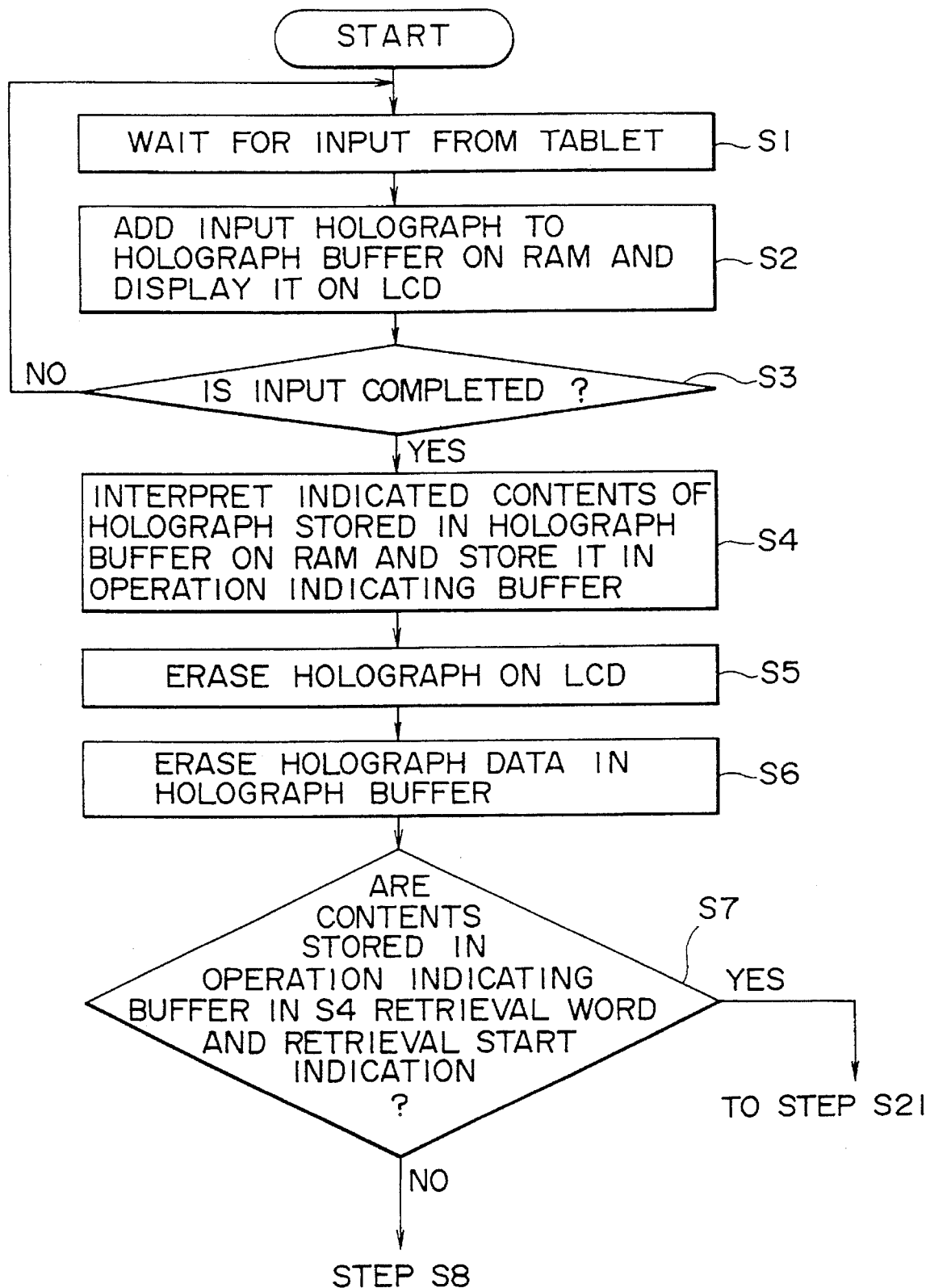
FIG. 5 is a flowchart for describing a first portion of a sequential operation executed by the embodiment shown in FIG. 1.
Figure 6:
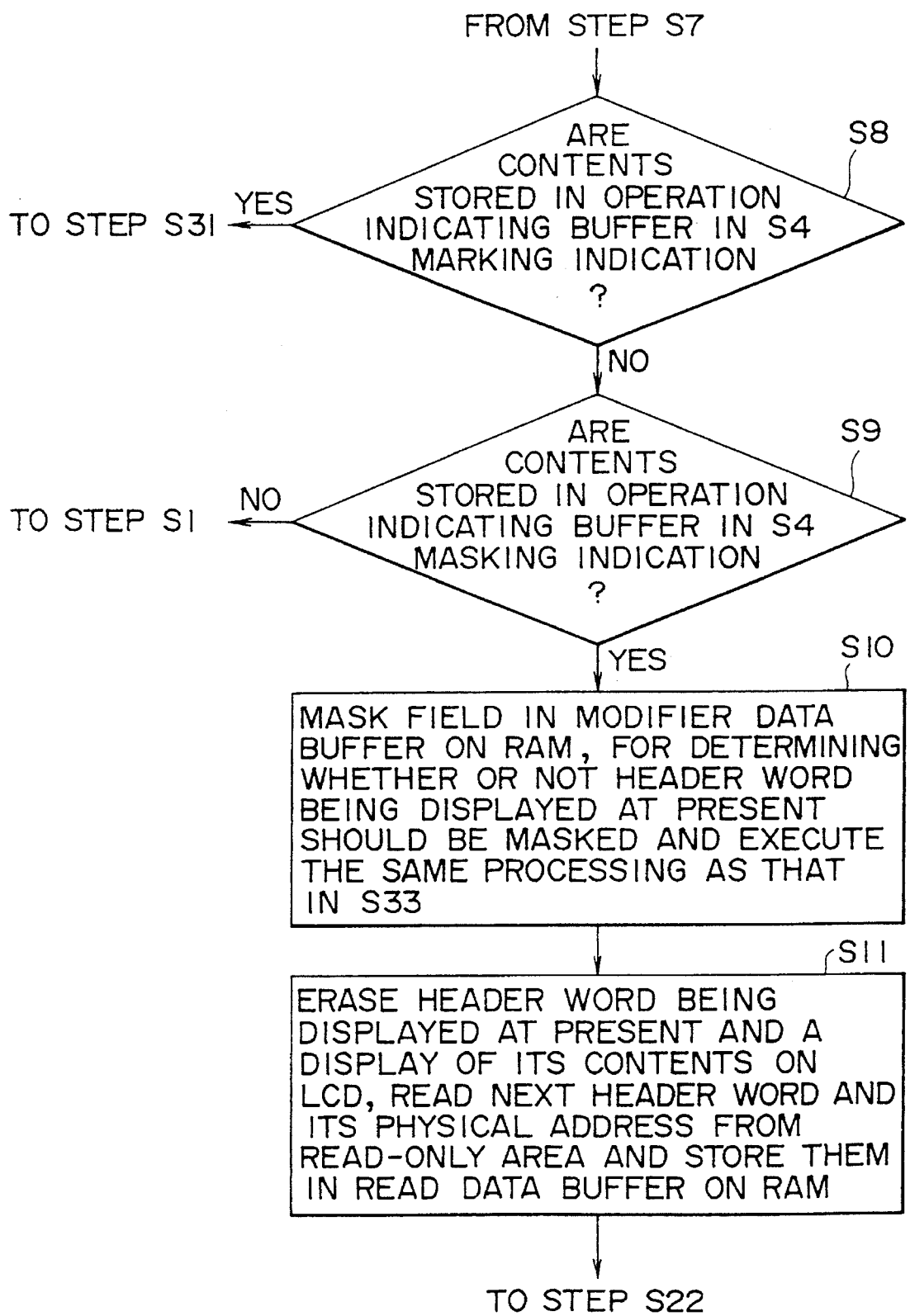
FIG. 6 is a flowchart for describing a second portion of the sequential operation executed by the embodiment shown in FIG. 1.

All the elements of structure shown in FIG. 1 are accommodated in a single case so as to construct a portable information processing apparatus 1000 as shown in FIG. 4. The hybrid disc 804 is held in a cartridge 804C, which is loaded into a slot 40 defined in the portable information processing apparatus 1000. The tablet 10 is disposed on the LCD 24 of the portable information processing apparatus 1000. A user can write information thereon using the pen 30 which serves as a pointing device. A handwriting or holograph interpretation button 32 is displayed on the LCD 24 as an icon. When the user gives an indication to the holograph interpretation button 32 using the pen 30, the interpretation of a holograph is started. Further, the portable information processing apparatus 1000 is provided with a cross cursor key 34. When the cross cursor key 34 is operated, the contents displayed on the LCD 24 are scrolled. Moreover, the portable information processing apparatus 1000 is provided with a disc eject button 36 and a power button 38. When they are respectively operated, the cartridge 804C having the hybrid disc 804 held therein is ejected from the slot 40 and a power supply is turned off.

The operation of the aforementioned one embodiment will next be described with reference to flowcharts shown in FIGS. 5, 6, 7 and 8. In Step S1, an input to be given by the user through the tablet 10 is placed in a waiting state. The tablet 10 outputs a coordinate value at a position depressed by the user using the pen 30 to the micon 12. The data outputted from the tablet 10 is stored in a temporary work area on the RAM 18 by the CPU 14. When the pen 30 is held in a depressed state, the tablet 10 outputs the coordinate value at the depressed position to the micon 12 for each predetermined travel distance. FIG. 9 shows one example of coordinate-point string data. When the pen 30 is separated from the surface of the tablet 10, the tablet 10 adds data indicative of the fact that ⌊the pen has been lifted up⌉ to its corresponding coordinates and outputs the result of addition therefrom. Correspondingly, the CPU 14 completes a holograph inputting process and hence the CPU 14 proceeds to Step S2.

In Step S2, the CPU 14 adds coordinate-point string data (see FIG. 9) corresponding to one picture or image stored in the temporary work area on the RAM 18 to a holograph buffer ensured on the RAM 18. FIG. 10 shows one example of the contents stored in the holograph buffer in the RAM 18, i.e., one example of a format for the holograph buffer. Further, the CPU 14 causes the LCD driver 22 to display the coordinate-point string data on the LCD 24.

Next, the CPU 14 decides in Step S3 whether or not the input has been made by the user. That is, the CPU 14 decides that the input has completely been made by the user owing to the fact that a part/all of a handwriting or holograph added to a position nearby the holograph buffer has passed through a specific area on the screen of the LCD 24. The specific area means an area occupied by a button-shaped graphic data displayed on the screen, for example. If the answer is NO in Step S3, then the routine procedure is returned to Step S1 again. If the answer is YES in Step S3, then the routine procedure proceeds to Step S4.

Figure 11:
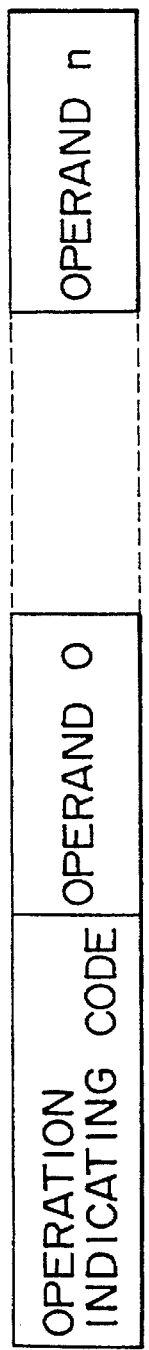
FIG. 11 is a view for explaining one example of a format for an operation indicating code stored in an operation indicating buffer of the RAM 18 shown in FIG. 1.

In Step S4, the CPU 14 interprets the indicated contents of the group of coordinate-point string data stored in the holograph buffer on the RAM 18. This interpretation is normally made by using a character recognizing process and a graphic recognizing process for inputting holograph point strings and outputting a character code and a graphic code, for example, respectively. Either the character recognizing process or the graphic recognizing process is executed using the RAM 18 set as the work area, based on the programs stored in the ROM 16. The indicated contents of the group of the coordinate-point string data are determined by these recognizing processes and placed in an operation instructing or indicating buffer on the RAM 18. FIG. 11 shows one example of an operation indicating code.

In Step S5, the CPU 14 erases a handwriting or holograph corresponding to the group of coordinate-point string data stored in the holograph buffer from the LCD 24.

In Step S6, the CPU 14 erases the group of coordinate-point string data stored in the holograph buffer.

Figure 12:
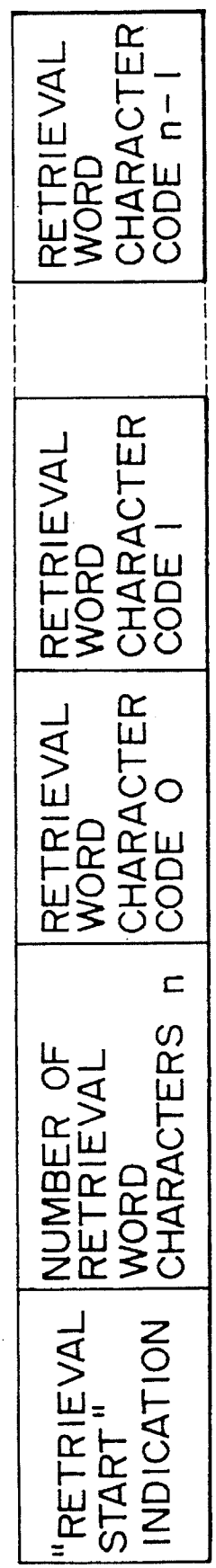
FIG. 12 is a view for describing one example of a format for a retrieval start indicating code and retrieval words both stored in the operation indicating buffer of the RAM 18 shown in FIG. 1.

In Step S7, the CPU 14 makes a decision as to whether or not the contents stored in the operation indicating buffer in Step S4 are of ⌊retrieval words⌉ and a ⌊retrieval start indication⌉. FIG. 12 shows one example of a format of a ⌊retrieval start indicating code⌉ and ⌊retrieval words⌉. Assuming now that the ⌊retrieval words⌉ is given by a normal character code string and the ⌊retrieval start indicating code⌉ is represented by a graphic code indicative of a triangle, the CPU 14 makes a decision as to whether or not the contents in the operation indicating buffer correspond to the character code string and the graphic code. If the answer is NO in Step S7, then the CPU 14 proceeds to Step S8. If the answer is YES in Step S7, then the CPU 14 proceeds to Step S21.

In Step S8, the CPU 14 makes a decision as to whether or not the contents stored in the operation indicating buffer in Step S4 represent a ⌊marking indication⌉. FIG. 13 shows one example of a format of a marking indicating code. The ⌊marking indicating code⌉ corresponds to a one-image holograph (ink data) represented by a kinked or bent line string and is represented by a graphic code indicative of a bent line string and a coordinate point string. If the answer is YES in Step S8, then the CPU 14 proceeds to Step S31. If the answer is NO in Step S8, then the CPU 14 proceeds to Step S9.

In Step S9, the CPU 14 decides whether or not the contents stored in the operation indicating buffer in Step S4 represents a ⌊masking indication⌉. FIG. 14 shows one example of a format of a ⌊masking indicating code⌉. The ⌊masking indicating code⌉ shows two-image holographs having a shape very similar to a symbol x and is represented by a graphic code indicative of the symbol x and vertex or top coordinates of a circumscribed quadrilateral of the holographs. If the answer is YES in Step S9, then the CPU 14 proceeds to Step S10. If the answer is NO in Step S9, then the CPU 14 is returned to Step S1.

In Step S21, the CPU 14 reads a data block on the hybrid disc 804 with each of the retrieval words as the index or header word, and a physical address on the hybrid disc 804 from the read-only area and causes a read data buffer of the RAM 18 to store the read data and physical address therein. FIG. 15 shows one example of a format of the contents stored in the read data buffer.

Figure 16:
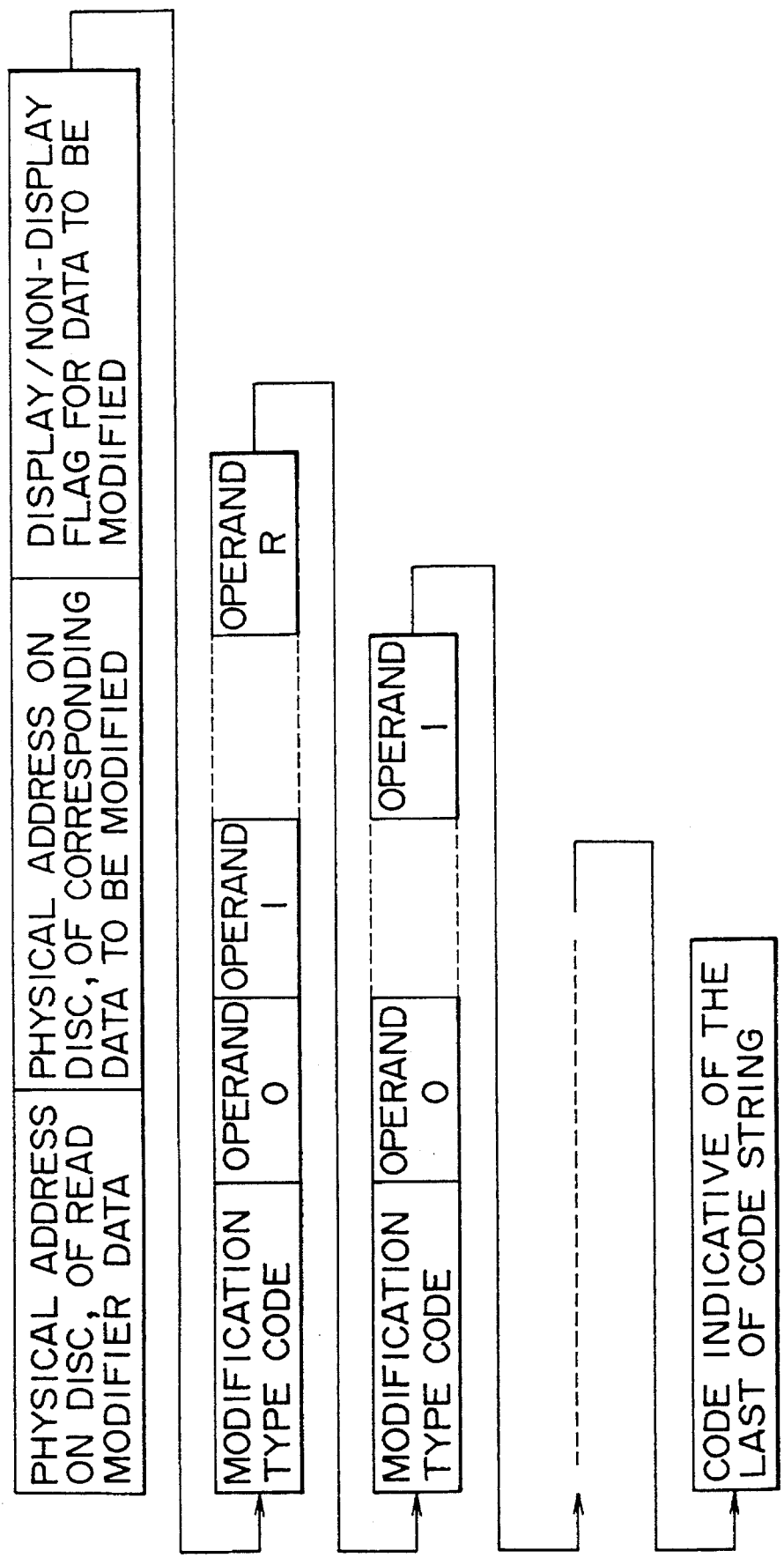
FIG. 16 is a view for describing one example of a format for a modifier data buffer of the RAM 18 shown in FIG. 1.
Figure 21:
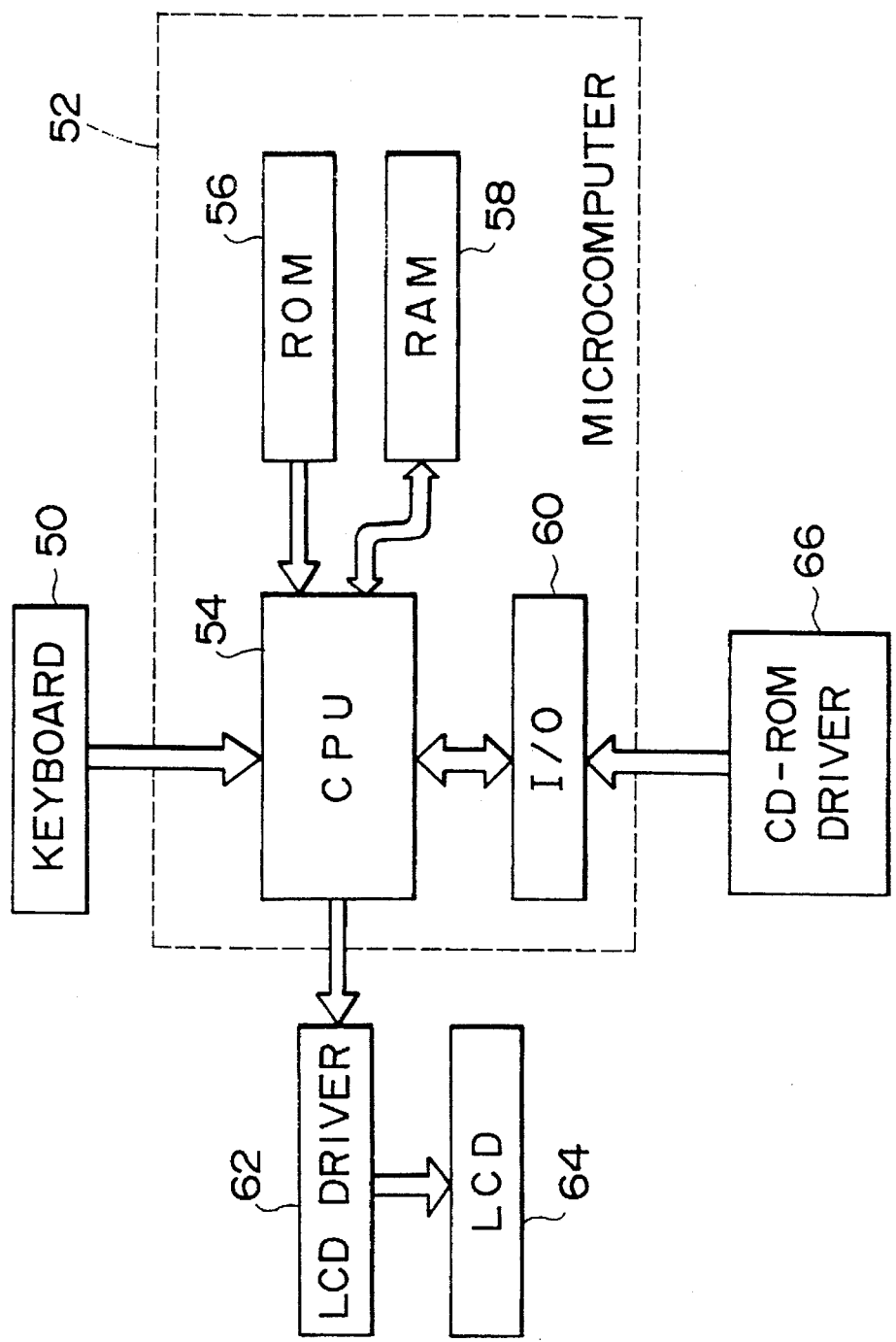
FIG. 21 is a block diagram showing one example of a conventional information processing apparatus.

In Step S22, the CPU 14 reads attribute data for changing a character modification, which corresponds to the physical address in the read data block, holograph data for marking of specific characters and the physical address on the hybrid disc 804 from the read/write area of the hybrid disc 804. In step S22 the CPU 14 causes a modifier data buffer on the RAM 18 to store the physical address on the hybrid disc 804, of the corresponding read data therein. FIG. 16 shows one example of a format of the contents stored in the modifier data buffer, i.e., the modifier data buffer.

In Step S23, the CPU 14 determines display data obtained by changing or modifying the data read in Step S21 as indicated or instructed by the modifier data in Step S22 and displays it on the LCD 24. FIG. 17 shows the contents displayed on the LCD 24 immediately after the data has been read from the hybrid disc 804 in Step S23. After its display, the CPU 14 is returned to Step S1.

In Step S31, the CPU 14 determines an offset address value within a data block of character data being displayed, which exists in the vicinity of an area through which the holograph of a ⌊marking indication⌉ in the operation indicating buffer has passed. When the holograph has passed through the vicinity of a plurality of character data, the CPU 14 determines offset address values corresponding to respective coordinate points of the ⌊marking indication⌉ holographs and adds the result of this determination to the modifier data buffer on the RAM 18.

In Step S32, the CPU 14 causes the LCD 24 to display each ⌊marking indication⌉ holograph thereon. FIG. 20 shows the contents displayed on the LCD 24 at the time that the term ⌊casual⌉ is underscored with a wavy line as a marking, a translated word ⌊extraordinary⌉ is surrounded by a circular handwriting or holograph and a holograph ⌊important⌉ is inputted.

In Step S33, the CPU 14 sends the contents stored in the modifier data buffer on the RAM 18 to the optical magnetic recording and reproducing device 8 and rewrites a portion corresponding to the data block which falls within the read/write area of the hybrid disc 804 and is being displayed at present, into the contents referred to above. After the rewriting has been finished, the CPU 14 is returned to Step S1.

In Step S10, the CPU 14 sets a field within the modifier data buffer for determining or specifying whether or not a header word in the data block which is being displayed at present should be masked (non-displayed), to a ⌊masking⌉ and executes the same processing as that in Step S33. FIG. 18 shows the contents displayed on the LCD 24 at the time that a masking indication (>) has been drawn on the header word to be masked.

In Step S11, the CPU 14 erases visual representation of the above header word and items contained therein on the LCD 24 from the LCD 24 and reads the next header word and its physical address from the read/write area of the hybrid disc 804. Further, the CPU 14 causes a read data buffer and a physical address data buffer on the RAM 18 to store them therein and proceeds to Step S22. FIG. 19 shows the manner in which the header word subsequent to the masked header word has been displayed on the LCD 24 in Step S11 after the masking process has been executed.

By using the properties of the hybrid disc 804 having the read/write area and the read-only area within the same medium, the aforementioned present embodiment of the present invention can bring about the following advantageous effects that could not be achieved by a data base using a conventional CD-ROM.

1. Handwritings or holographs equivalent or corresponding to an ⌊underline⌉ made by a red pen or the like, a ⌊mark⌉ made by a marker pen, etc., and symbols, both of which have been represented on a normal paper medium, can be recorded. Further, the holographs and the symbols can be stored so as to correspond to the contents of the data base.

2. When the above ⌊underline⌉ and ⌊mark⌉ are suitably written into the disc and the disc is loaded again after the disc has been ejected or taken out, the previous ⌊underline⌉ and ⌊mark⌉ can be left behind as they are.

3. The following operations A, B and C can be effected on the data base:

A. Modification of contents

B. Change in outward appearance at the time of visual representation (change in font size, color, style of type, etc. of header word)

C. Editing operations such as virtual removal of a header word and its corresponding contents from the data base.

Incidentally, the present invention is not necessarily limited to the above embodiment alone. The programs in the ROM 16 and the format for the read/write area of the hybrid disc 804 can be set so that the following items (1) through (5), for example, can be executed:

(1) Overwriting correction of contents (character)

(2) Change in font size of header word and/or contents (character)

(3) Change in style of type of header word and/or contents (character)

(4) Change in character modification of header word and/or contents (character)

(5) Change in color of header word and/or contents (character).

When a recording medium with voice data is used, the programs in the ROM 16 and the format for the read/write area of the recording medium, or the hybrid disc 804 can be set in such a manner that the following items (1) through (3) can be performed:

(1) Setting of volume of respective voice data (2) Setting of effector used upon reproduction of respective voice data (3) Designation of reproduction language at the time of reproduction of bilingual voice data.

When a recording medium with image data is used, the programs in the ROM 16 and the format for the read/write area of the recording medium, or the hybrid disc 804 can be set so that the following items (1) through (3), for example, can be established:

(1) Display position for each image data (2) Display size for each image data (3) Number of display colors to be used for each image data.

Further, the above-described embodiment describes the case where the CPU 14 effects the transfer of the data between the optical magnetic recording and reproducing device 8 and the RAM 16. However, a DMAC (Direct Memory Access Controller) may be provided so that the transfer of data is directly effected between the optical magnetic recording and reproducing device 8 and the RAM 16 without the aid of the CPU 14.

Having now fully described the invention, it will be apparent to those skilled in the art that many changes and modifications can be made without departing from the spirit or scope of the invention as set forth herein.

What is claimed is:

1. An information processing apparatus comprising:

inputting means for inputting of information from an operator by handwriting;

processing means for effecting processing on the handwritten information input by the operator and for outputting holograph information corresponding to the handwritten information; and recording and reproducing means for recording information on and reproducing the information from a disc recording medium having a read-only area with predetermined information recorded thereon in advance and a read/write area for storing therein the holograph information.

2. An information processing apparatus as claimed in claim 1, further comprising displaying means for displaying the holograph information.

3. An information processing apparatus according to claim 1, wherein the inputting means comprises a pressure sensitive tablet.

4. An information recording apparatus according to claim 1, wherein the recording and reproducing means reproduces information from the read-only area of the disc recording medium by using a diffraction phenomenon of light rejected from the read-only area.

5. An information processing apparatus for use with a hybrid disc having a read-only area and a read/write area, the information processing apparatus comprising:

a processing unit;

a recording and reproducing unit for reproducing read-only data from the read-only area of the disc and for sending the read-only data to the processing unit;

a display for receiving at least the read-only data from the processing unit and for displaying at least the read-only data; and an input means for inputting of coordinate data from a user by handwriting and for sending the coordinate data to the processing unit;

wherein the processing unit has means for processing the coordinate data to generate modifier data which represents a holograph corresponding to the coordinate data, the processing unit sends the modifier data to the recording and reproducing unit, and the recording and reproducing means has means for writing the modifier information to the read/write area of the disc.

6. The information processing apparatus according to claim 5, wherein the input means is disposed over the display.

7. The information processing apparatus according to claim 5, wherein the input means is a pressure sensitive tablet which receives the coordinate data corresponding to pressure from the user's finger or a pen.

8. The information processing apparatus according to claim 5, wherein the recording and reproducing unit has means for reproducing the read-only data from the read-only area of the disc by a diffraction phenomenon of light reflected from the read-only area of the disc.

9. The information processing apparatus according to claim 5, wherein the display has means for receiving the coordinate data from the processing unit and for displaying the coordinate data.

10. The information processing apparatus according to claim 5, wherein the display has means for receiving the modifier data from the processing unit and for displaying the modifier data.

11. The information processing apparatus according to claim 5, wherein the recording and reproducing unit has means for reproducing modifier data from the read/write area of the disc and for sending the modifier data to the processing unit, the processing unit has means for sending the modifier data to the display, and the display has means for displaying the modifier data reproduced from the read/write area of the disc.

12. The information processing apparatus according to claim 5, wherein the processing unit comprises a processing means and a random access memory (RAM).

13. The information processing apparatus of claim 12, wherein the input means has means for sending the coordinate data to the processing unit at predetermined travel distances, and the processing unit has means for storing the coordinate data sent from the input means to the processing unit in a temporary work area in the RAM of the processing unit as coordinate string data.

14. The information processing apparatus according to claim 5, wherein the processing unit has means for determining whether inputting of coordinate data from a user has been completed.

15. The information processing apparatus according to claim 5, wherein the coordinate data input from the user represents coordinates defined with reference to an X axis and an orthogonal Y axis.

* * * * *